US010801690B2

(12) United States Patent
 Valois et al.

(10) Patent No.: US 10,801,690 B2
(45) Date of Patent: Oct. 13, 2020

(54) ILLUMINATION MODULE FOR A MOTOR VEHICLE INCLUDING AN OPAQUE MASK

(71) Applicant: VALEO VISION BELGIQUE, Meslin l'Eveque (BE)

(72) Inventors: Christophe Valois, Meslin l'Eveque (BE); Kurt Depoorter, Meslin l'Eveque (BE); Frederic Luu, Meslin l'Eveque (BE)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 0 days.

(21) Appl. No.: 15/653,029

(22) Filed: Jul. 18, 2017

(65) Prior Publication Data
US 2018/0017226 A1   Jan. 18, 2018

(30) Foreign Application Priority Data

Jul. 18, 2016   (FR) .................................... 16 56838

(51) Int. Cl.
| *F21V 5/04* | (2006.01) |
| *B60Q 1/00* | (2006.01) |
| *F21S 43/236* | (2018.01) |
| *F21S 43/251* | (2018.01) |
| *F21S 43/245* | (2018.01) |
| *F21S 43/20* | (2018.01) |

(Continued)

(52) U.S. Cl.
CPC .............. *F21S 43/236* (2018.01); *B60Q 1/00* (2013.01); *B60Q 3/62* (2017.02); *F21S 43/20* (2018.01); *F21S 43/237* (2018.01); *F21S 43/245* (2018.01); *F21S 43/251* (2018.01); *F21S 43/26* (2018.01); *F21S 43/50* (2018.01); *F21V 5/04* (2013.01); *F21S 43/14* (2018.01); *F21S 43/241* (2018.01); *F21S 43/243* (2018.01)

(58) Field of Classification Search
CPC ..... F21S 48/2231; F21S 48/2212; F21V 5/04; B60Q 3/62; B60Q 1/00
See application file for complete search history.

(56) References Cited

U.S. PATENT DOCUMENTS

| 2010/0195342 A1 | 8/2010 | Lambert et al. |
| 2013/0223088 A1 | 8/2013 | Lambert et al. |

(Continued)

FOREIGN PATENT DOCUMENTS

| EP | 0 306 399 A1 | 3/1989 |
| FR | 3 008 774 A1 | 1/2015 |
| WO | WO 2013/113728 A1 | 8/2013 |

OTHER PUBLICATIONS

French Preliminary Search Report dated Mar. 31, 2017 in French Application 16 56838 filed on Jul. 18, 2016 (with English Translation of Categories of cited documents).

*Primary Examiner* — Joseph L Williams
(74) *Attorney, Agent, or Firm* — Oblon, McClelland, Maier & Neustadt, L.L.P.

(57) ABSTRACT

An illumination module for a motor vehicle that includes at least a light source, an optical light guide including an entry face for the light emitted by the light source and a light exit face. The optical guide is arranged in order to allow propagation of the light from its entry face to its exit face. An opaque mask is arranged on the path of the light rays exiting the optical guide and includes at least one window allowing the passage of the light. At least one supplementary optical element closes off the window. The supplementary optical element includes a convergent optical device.

20 Claims, 2 Drawing Sheets

(51) Int. Cl.
*F21S 43/50* (2018.01)
*F21S 43/237* (2018.01)
*B60Q 3/62* (2017.01)
*F21S 43/241* (2018.01)
*F21S 43/243* (2018.01)
*F21S 43/14* (2018.01)

(56) References Cited

U.S. PATENT DOCUMENTS

2014/0078764 A1 3/2014 Aizawa
2016/0195230 A1 7/2016 Grosdidier

ILLUMINATION MODULE FOR A MOTOR VEHICLE INCLUDING AN OPAQUE MASK

The present invention relates to an illumination module fitted in a motor vehicle, comprising at least one light source, an optical guide and a supplementary optical element. The invention applies to the field of lighting and/or signaling for a motor vehicle.

Currently, in devices for lighting up the road or the signaling devices of the vehicle, it is known to use one or more optical guides associated, respectively, with a light source and arranged in order to propagate, from an entry face to an exit face, by means of successive internal total reflections, rays emitted by the light source, said rays being projected outside the optical guide in order to form a specific light beam. Use may be made of such arrangements with optical guides in order to achieve lighting and/or signaling functions with specific photometric quantities or, alternately, in devices for lighting up the vehicle passenger compartment.

The use of these optical guides falls within a context in which car manufacturers increasingly wish to create a visual signature and to attribute it to a motor vehicle. The available possibility, for example, of curving these optical guides and of displaying a band of light that undulates or follows the curve of a vehicle makes it possible to distinguish vehicles by producing interior or exterior lighting and/or signaling devices that can easily differentiate between one vehicle marque and another.

The invention also falls within the dual context of stylistic freedom and photometric efficiency of lighting and/or signaling achieved, by proposing an alternative to existing illumination modules with one or more optical guides, which allows the projection of a beam exiting the illumination module that not only has the desired form but also the appropriate photometric quantities, without requiring the implementation of high-flow light sources.

An illumination module for a motor vehicle comprises, according to the invention, at least a light source, an optical guide comprising an entry face for the light emitted by the light source and a light exit face, the optical guide being arranged to allow propagation of the light from its entry face to its exit face. It further comprises an opaque mask arranged on the path of the light rays exiting the optical guide and comprising at least one window allowing the passage of the light, and it comprises at least one supplementary optical element closing off the window. The supplementary optical element comprises a convergent optical device.

The supplementary optical element comprises an entry surface for emitted rays exiting the optical guide and an exit surface for a light beam.

According to a series of features of the invention, taken alone or in combination, provision may be made for:

the convergent optical device to be arranged on an internal face of the supplementary optical element turned to face the exit face of the optical guide;
the convergent optical device to be arranged on the exit surface of the supplementary optical element;
the convergent optical device to comprise a convex zone directed toward the exit face of the optical guide;
the convex zone to have a radius of curvature defined as a function of the distance between the center of curvature of the convex zone and the exit face of the optical guide;
the convergent optical device to be a cylindrical lens extending in particular along a central axis parallel to an axis of extension of the optical guide;
an object focus of the cylindrical lens to be centered on the optical guide; a possible design is that the focus of the cylindrical lens is targeted on the center of the optical guide or on its exit face;
the convex zone to be translucent;
the convex zone to have a grained texture;
the convex zone possibly to be overmolded on the supplementary optical element, or to be produced as a single component with and optical element;
the convergent optical device to comprise a transparent border around the convex zone;
the window to be substantially a cut-away parallelogram having dimensions equal to the exit face of the optical guide;
the opaque mask to comprise a plurality of windows aligned along an axis of alignment perpendicularly to the axis of extension of the optical guides;
each window to be closed off by a convergent optical device; and, in particular, provision may be made for a convergent optical device specific to each window;
the supplementary optical element to comprise a plurality of aligned convergent optical devices;
each window to be associated with an optical guide and/or a specific light source;
at least two windows to be separated from one another by the opaque mask preventing the passage of the light;
the convex zone of the convergent optical device to have a radius of curvature defined as a function of the height of the window to which the convex zone corresponds;
the supplementary optical element and the opaque mask to form a single component.

The invention further relates to a lighting and/or signaling device for a motor vehicle comprising an illumination module as just presented.

Other features, details and advantages of the invention will become more clearly apparent upon reading the description given below by way of indication, in relation to the drawings in which.

The embodiments described below are in no way limiting; it would be possible, in particular, to imagine variants of the invention that comprise only a selection of the features described below, in isolation from the other described features, if that selection of features is sufficient to confer a technical advantage or to distinguish the invention from the prior art.

An illumination module 2 according to the invention is capable of emitting an exit light beam having a stylistic effect.

This illumination module 2 comprises a housing defining a casing in which at least one light source 4 and at least one optical guide 6 are arranged, each light source being, respectively, associated with an optical guide configured in order to propagate the rays emitted by the source over a given length and in order to cause them to exit in the direction of the exit from the illumination module. The casing formed in the housing is closed by the fitting of a lens on the housing, the lens being configured in order to be traversed in certain zones by the light rays emitted by the at least one optical guide.

The light sources 4 each consist of a semi-conductor source and, for example, an electroluminescent diode secured on a printed circuit board, which may be common to all the electroluminescent diodes and which may, in particular, be secured to the housing of the illumination module.

Figure 1:
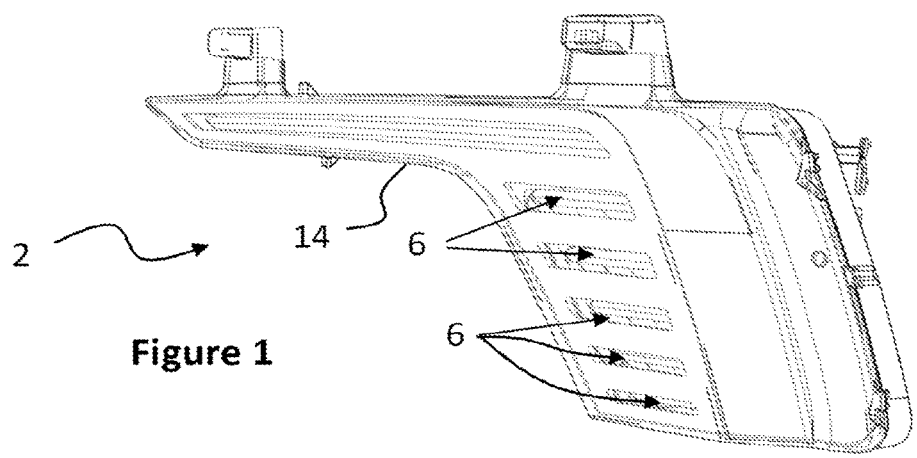
FIG. 1 is a three-quarter front perspective view of the illumination module according to one embodiment of the invention, in which an end of an optical guide and also a supplementary optical element and an opaque mask have been made visible.
Figure 2:
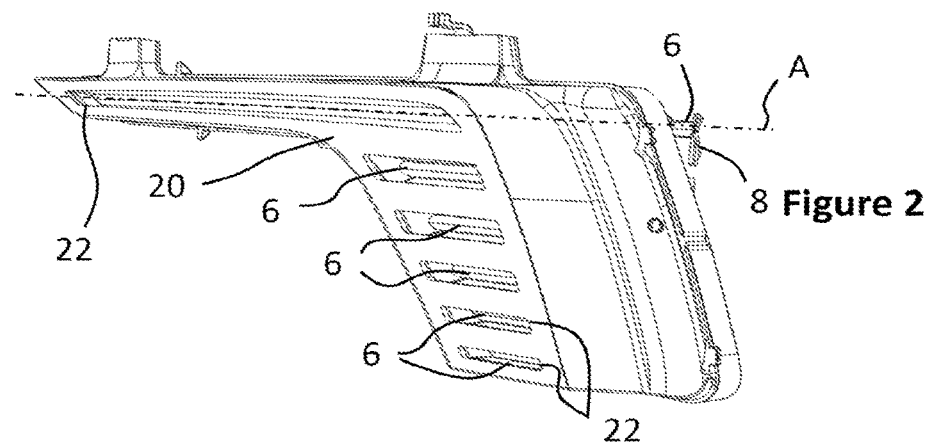
FIG. 2 is a perspective view similar to that of FIG. 1, in which the supplementary optical element has been removed in order to make the windows formed in the opaque mask more visible.
Figure 3:
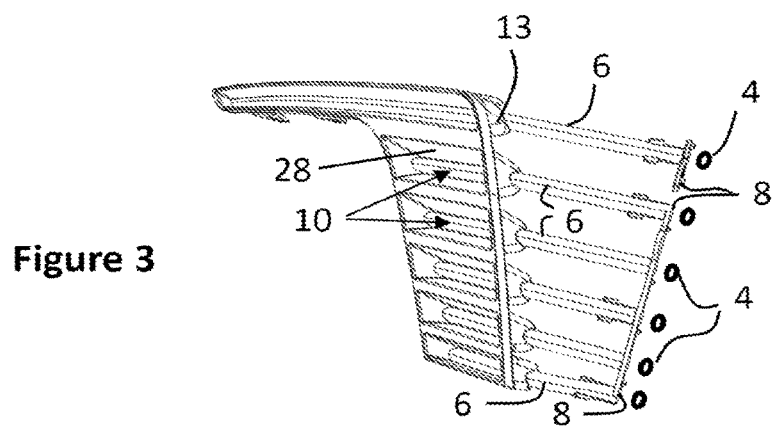
FIG. 3 is a perspective view similar to that of FIG. 1, in which the supplementary optical element has been removed in order to make the windows formed in the opaque mask more visible.
Figure 4:
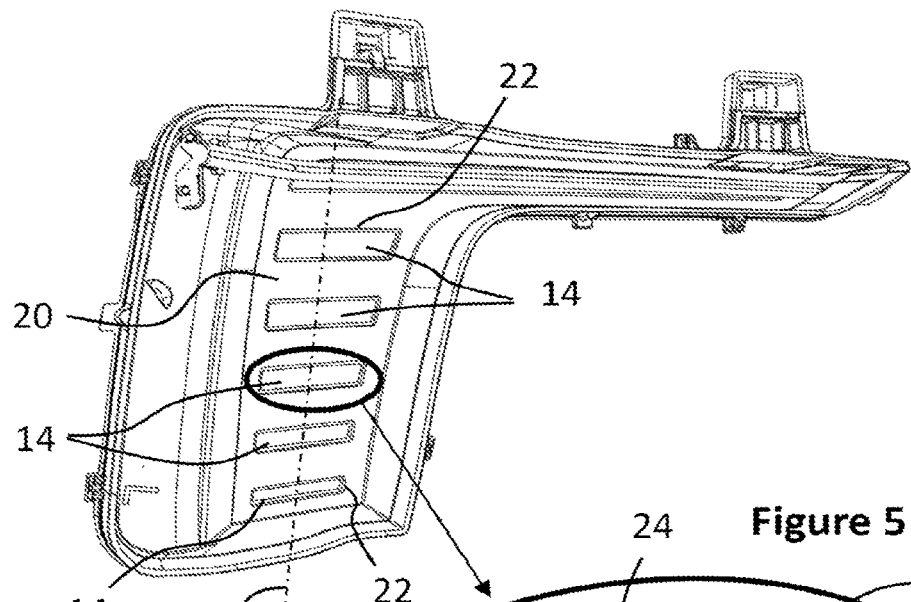
FIG. 4 is a three-quarter rear perspective view of the supplementary optical element and the opaque mask.
Figure 5:
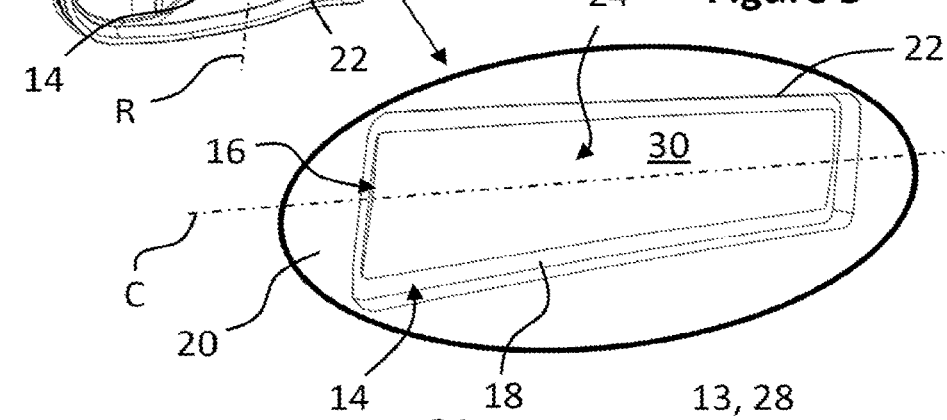
FIG. 5 is a detailed view of a convergent optical device of the supplementary optical element.

In the example illustrated, each optical guide 6 has a circular section and a curved profile, with a principal axis A of extension. The optical guide 6 comprises an entry face 8 for the light emitted by the light source 4 and an exit face 10. The optical guide 6, which can be seen in FIGS. 1, 3 and 4, further comprises a rear reflection face 12, opposite the exit face 10, which is provided with a succession of prisms.

The optical guides may be produced from a material that allows the propagation of the light rays by internal reflection from the entry face to the exit face, for example poylcarbonate (PC) or poly(methyl methacrylate) (PMMA) or silicone or glass.

It will be understood that the light rays emitted by a light source penetrate the corresponding optical guide via the entry face 8 and that they propagate along the tube forming the optical guide by means of successive total internal reflections until these rays encounter the prisms of the rear reflection face: this leads to a modification of the angle of incidence of the rays and some of them strike the exit face, opposite this rear reflection face 12, at an angle such that they exit the optical guide.

Optical guides 6 of this type make it possible to obtain the emission of a light of substantially homogeneous aspect over the length of the exit face of the optical guide 6 when the latter is in the lit state.

The optical guides 6 are arranged substantially transversely along the illumination module, along a principal axis A of extension, carried by a support 13 that has inclined walls surrounding each of the guides respectively, and one end of which is in contact with the guide whereas the free end widens toward the exit from the illumination module. These walls form reflectors 28, reflecting the light emitted from the exit face 10 of the optical guide 6 toward the exit from the illumination module. These reflectors 28 are arranged in such a way as to contain the rays exiting the exit face 10 of the optical guide in a specific angular range, it being understood that the orientation of the reflectors may, in particular, vary as a function of the position of the optical guide when the illumination module is installed in the vehicle.

A more detailed description will now be given of a first element that allows a particular stylistic effect to be obtained from the light beam exiting the illumination module 2, and which comprises a supplementary optical element 14 and an opaque mask 20, forming the lens of the illumination module 2.

The supplementary optical element 14 comprises at least one convergent optical device 16 configured in order to group together the rays exiting the corresponding optical guide.

The convergent optical device 16 comprises at least one translucent convex zone 30 formed on the internal face of the supplementary optical element 14, that is to say the face turned toward the interior of the casing, in the direction of the optical guide. The convex zone 30 is arranged on the passage of the emitted rays exiting the optical guide and reflected by the walls of the support 13, and it is configured such that the domed portion of this convex zone is directed toward the exit face 10 of the optical guide 6. In other words, the convex zone is oriented such that its center of curvature is arranged opposite the optical guide in relation to the convergent optical device 16.

As has been specified, preferably the convergent lens is arranged on an entry surface 24 of the supplementary optical element, also called the internal face 24, that is to say opposite the exit face 10 of the optical guide 6. In a variant embodiment that is not illustrated, the convergent lens may be arranged on an exit surface 26 of the supplementary optical element 14.

In the embodiment illustrated, the present translucent convex zone 30 is a cylindrical convergent lens. This convergent lens is cylindrical, having a central axis C parallel or substantially parallel to the axis A of extension of the optical guide 6. Thus, the convergent lens is configured in order to concentrate the light rays originating from the exit face 10 and reflected by the walls of the casing 13. It will be understood that the cylindrical lens extends over a distance, along the axis A of extension, that is substantially equal to that of the exit face of the optical guide 6, so as to recover all the rays. The convergent lens, otherwise called the convex zone 30, has a radius of curvature defined in accordance with the concentration of the emitted rays sought. By way of example, the convergent lens may have a radius of from 10 to 15 mm and, in particular, 13 mm. The radius of curvature of the convex zone may, for example, be a function of the distance between the center of curvature of the convex zone and the exit face 10 of the optical guide 6.

More particularly, provision may be made for the object focus of the convergent lens to be arranged in the vicinity of the central axis of extension of the optical guide or, alternately, in the vicinity of that portion of the exit face 10 that is closest to the convergent lens.

In the example illustrated, the cylindrical lens is centered vertically on the optical guide, i.e. when the illumination module is in position in the vehicle the center of the cylindrical lens of the supplementary optical element 14 and the center of the associated optical guide 6 are arranged at the same height in relation to the ground.

The convergent lens comprises at least one zone in which a grained texture, producing a blurred effect, has been produced. By way of example, the grain may have a dimension of 20 µm. This is an attempt to reconcile the required stylistic effect and the optical performance of the module, it being understood that too coarse a grain has to be avoided because the diffusion would be too great and would render the product ineffective. Furthermore, consideration is given to the fact that the diffusion produced by one and the same grain depends on the distance between the optical guide and the grained zone.

This grained texture may be produced on the surface on the internal face of the lens or, alternatively, on the external face, i.e. the face turned away from the optical guide.

Figure 6:
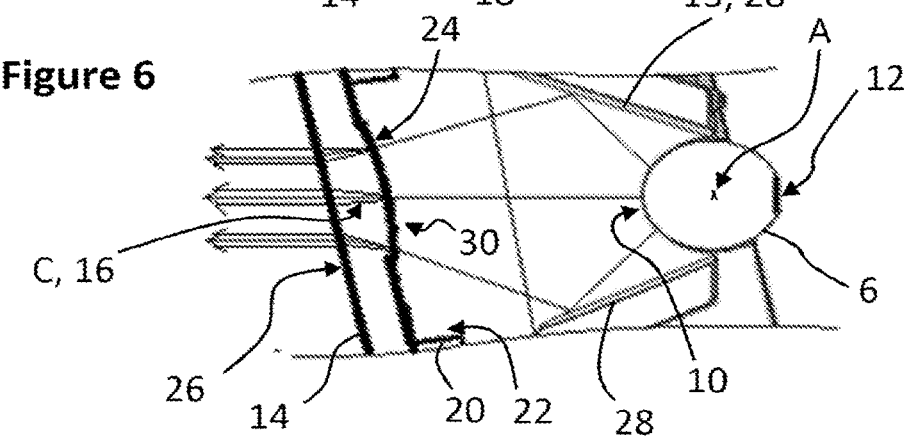
FIG. 6 is a transverse cross-sectional view of the convergent optical device according to one aspect of the invention and of the associated light guide.

The graining of the convergent optical device 16 allows the formation, after the rays R (some of which are represented by way of example in FIG. 6) emitted by the light source and propagated by the guide traverse the supplementary optical element 14, of a light beam exiting the illumination module, via the exit surface 26 of the lens, that is diffuse and homogeneous. The graining of the convergent optical device further plays a part in preventing an external observer from seeing the arrangement of the optical guide 6 in the illumination module 2.

This convex zone 30 is preferably bordered by a transparent, planar border 18, which is particularly useful when the supplementary optical element 14 is produced by overmolding of the opaque mask 20. It will be understood that an attempt is made to minimize this border, which corresponds to the zone of closure at the time of overmolding, in order to obtain the most effective system possible. In particular, this border must be at least equal to 1 mm.

The opaque mask 20 forms, together with the supplementary optical element 14, a first element that covers the whole illumination module 2. It will be understood that the opaque mask is designed to prevent the passage of light through it, allowing passage only through at least one window 22, at the center of which window a convergent optical device 16 is arranged.

This opaque mask 20 may be formed by a coating of opaque material or, alternately, be produced by an opaque material. It should be noted that, in the case illustrated, the opaque mask 20 is overmolded on the supplementary optical element 14, but it will be noted that other means of securing could be employed and, in particular, the production as one and the same component of the opaque mask 20 and of the supplementary optical element 14 forms one and the same component.

Each window 22 is substantially a parallelogram, preferably a rectangle. Each window 22 is associated either with a convergent optical device 16, an optical guide 6 and/or a light source 4 proper.

A plurality of convergent optical devices 16 is arranged on the supplementary optical element 14, in a row according to an axis R of alignment perpendicular to the axis A of extension of an optical guide, and, respectively, opposite the exit face 10 of an optical guide 6.

In the case illustrated, the illumination module 2 comprises six light sources 4 coupled to six optical guides 6, and one principal guide extends over substantially the entire length of the illumination module, while the five others have shorter lengths that are substantially equal and are connected together at one of their ends. This number of six optical guides means that the supplementary optical element 14 covering all the optical guides 6 comprises, for its part, six convergent optical guides 16, each opposite an optical guide 6, in particular opposite an exit face 10 of an optical guide 6. The six optical guides 6 have extension lengths, in particular exit face lengths, L that are different, decreasing in the top-to-bottom or bottom-to-top direction, i.e. the extension length of each optical guide 6 also decreases in the top-to-bottom or bottom-to-top direction.

This number of six optical guides also has the result that the opaque mask 20 comprises six windows 22, inside which an optical guide is, respectively, provided. It will be noted that the windows 22 are aligned with one another in parallel along an axis R of alignment, perpendicularly to the axis A of extension of the optical guides 6. The height of the windows is understood to be the dimension along the axis R of alignment, and the height of different windows may vary. The radius of curvature of the convergent optical device 16 may be dependent on the height of the window to which it corresponds, with a view to obtaining an identical concentration of the light rays exiting each window.

As just presented, an illumination module 2 may irrespectively be arranged in an exterior or interior lighting and/or signaling device of a motor vehicle. According to the construction of the lighting and/or signaling device ultimately required, other variant embodiments may be envisaged while still complying with the context of the invention.

The invention claimed is:

1. Illumination module for a motor vehicle, comprising at least:
   a light source,
   an optical light guide comprising an entry face for the light emitted by the light source and a light exit face, the optical guide being arranged in order to allow propagation of the light from its entry face to its exit face,
   an opaque mask arranged on the path of the light rays exiting the optical guide and comprising at least one window allowing the passage of the light,
   at least one supplementary optical element closing off the at least one window,
   the illumination module wherein the supplementary optical element comprises a convergent optical device.

2. Illumination module according to the claim 1, wherein the convergent optical device is arranged on an internal face of the supplementary optical element turned to face the exit face of the optical guide.

3. Illumination module according to claim 1, wherein the convergent optical device comprises a convex zone directed towards the exit face of the optical guide.

4. Illumination module according to claim 3, wherein the convex zone has a radius of curvature defined as a function of the distance between the center of curvature of the convex zone and the exit face of the optical guide.

5. Illumination module according to claim 3, wherein the convergent optical device is a cylindrical lens.

6. Illumination module according to claim 5, wherein an object focus of the cylindrical lens is centered on the optical guide.

7. Illumination module according to claim 2, wherein the convex zone is translucent.

8. Illumination module according to claim 3, wherein the convex zone has a grained texture.

9. Illumination module according to claim 3, wherein the convergent optical device comprises a transparent border around the convex zone.

10. Illumination module according to claim 1, wherein the opaque mask comprises a plurality of windows aligned along an axis of alignment perpendicularly to the axis of extension of the optical guides.

11. Illumination module according to claim 10, wherein each window is closed off by a convergent optical device.

12. Illumination module according to claim 1, wherein the supplementary optical element comprises a plurality of aligned convergent optical devices.

13. Illumination module according to claim 1, wherein the supplementary optical element and the opaque mask form a single component.

14. Lighting and/or signaling device for a motor vehicle comprising an illumination module according to claim 1.

15. Illumination module according to claim 4, wherein the convergent optical device is a cylindrical lens.

16. Illumination module according to claim 4, wherein the convex zone is translucent.

17. Illumination module according to claim 4, wherein the convex zone has a grained texture.

18. Illumination module according to claim 4, wherein the convergent optical device comprises a transparent border around the convex zone.

19. Illumination module according to claim 2, wherein the opaque mask comprises a plurality of windows aligned along an axis (R) of alignment perpendicularly to the axis (A) of extension of the optical guides.

20. Illumination module according to claim 2, wherein the supplementary optical element comprises a plurality of aligned convergent optical devices.

* * * * *